US008346052B2

(12) United States Patent
Ichimura

(10) Patent No.: US 8,346,052 B2
(45) Date of Patent: Jan. 1, 2013

(54) DATA TRANSMISSION AND RECEPTION SYSTEM, DATA REPEATING APPARATUS, DATA RECEIVING APPARATUS, DATA REPEATING METHOD, AND DATA RECEIVING METHOD

(75) Inventor: Gen Ichimura, Tokyo (JP)

(73) Assignee: Sony Corporation, Tokyo (JP)

( * ) Notice: Subject to any disclaimer, the term of this patent is extended or adjusted under 35 U.S.C. 154(b) by 457 days.

(21) Appl. No.: 12/669,434

(22) PCT Filed: Jul. 23, 2008

(86) PCT No.: PCT/JP2008/063157
§ 371 (c)(1), (2), (4) Date: Jan. 15, 2010

(87) PCT Pub. No.: WO2009/016999
PCT Pub. Date: Feb. 5, 2009

(65) Prior Publication Data

US 2010/0189104 A1 Jul. 29, 2010

(30) Foreign Application Priority Data

Jul. 30, 2007 (JP) ................................ P2007-197722

(51) Int. Cl.
*H04N 5/932* (2006.01)
*H04N 5/94* (2006.01)
*H04N 7/12* (2006.01)

(52) U.S. Cl. .................... 386/201; 386/264; 375/240.26; 375/240.28

(58) Field of Classification Search ........................ None
See application file for complete search history.

(56) References Cited

U.S. PATENT DOCUMENTS

2004/0080671 A1* 4/2004 Siemens et al. ............... 348/473
2005/0147399 A1* 7/2005 Kimura et al. ................ 386/125
2008/0298532 A1* 12/2008 Wang ........................... 375/376
(Continued)

FOREIGN PATENT DOCUMENTS

EP 2 088 780 A1 8/2009
(Continued)

OTHER PUBLICATIONS

International Search Report dated Oct. 28, 2008, in PCT/JP2008/063157.
"High Definition Multimedia Interface Specification Version 1.1, pp. 72-82".

*Primary Examiner* — Faruk Hamza
*Assistant Examiner* — Andrew Oh
(74) *Attorney, Agent, or Firm* — Finnegan, Henderson, Farabow, Garrett & Dunner, L.L.P.

(57) ABSTRACT

In an HDMI-connected AV system, bidirectional data transmission between two devices is implemented at low cost. An audio amplifying device serving as an HDMI source and a display device as an HDMI sink are connected additionally using an auxiliary transmission path such as IEEE 1394, so that the data received by the display device 3 from another device is transmitted to the audio amplifying device 2 over the auxiliary transmission path. In this setup, the display device 3 generates a CTS based on a clock regenerated by ACR and on a TMDS clock received from the audio amplifying device 2 via the HDMI, and transmits the CTS over the auxiliary transmission path along with a frequency dividing ratio N. The audio amplifying device generates an audio signal clock from the CTS and N thus received.

4 Claims, 9 Drawing Sheets

U.S. PATENT DOCUMENTS

2009/0052599 A1* 2/2009 Yanagisawa et al. ......... 375/354

FOREIGN PATENT DOCUMENTS

JP 2002-311933 10/2002
JP 2007-311884 11/2007
JP 2008-85703 4/2008
JP 2008-145679 6/2008
WO WO 2006/101801 A2 9/2006
WO WO 2008/056718 A1 5/2008

* cited by examiner (a)
1
DVD DEVICE
[HDMI]
2
AUDIO AMPLIFYING DEVICE
[HDMI]
3
DISPLAY DEVICE
(b)
1-1
FIRST DVD REPRODUCING DEVICE
[HDMI(1)]
2
AUDIO AMPLIFYING DEVICE
[HDMI(1)]
3
DISPLAY DEVICE
[HDMI(2)]
1-2
SECOND DVD REPRODUCING DEVICE

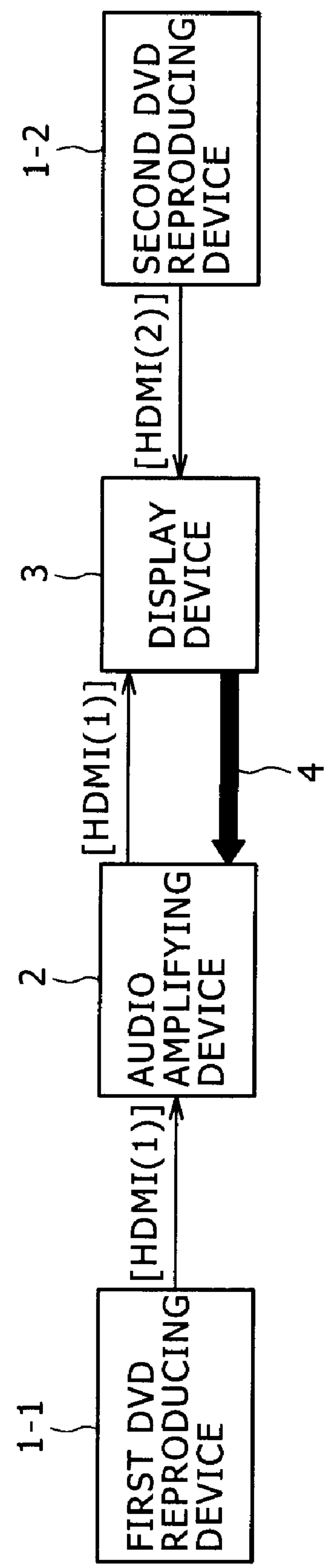
F I G . 2
1-1
FIRST DVD REPRODUCING DEVICE
[HDMI(1)]
2
AUDIO AMPLIFYING DEVICE
[HDMI(1)]
3
DISPLAY DEVICE
4
[HDMI(2)]
1-2
SECOND DVD REPRODUCING DEVICE 3
31-2
31-1
38
32-2
HDMI RECEIVING SECTION
32-1
HDMI RECEIVING SECTION
TMDS CLOCK
CTS2,N
37
AUXILIARY TRANSMISSION PATH CAPABLE-INTERFACE SECTION
VIDEO SIGNAL
VIDEO SIGNAL
33
SELECTOR
34
VIDEO SIGNAL PROCESSING SECTION
35
DISPLAY DRIVING SECTION
36

110
111
DHMI RECEIVER
VIDEO SIGNAL
AUDIO SIGNAL
CONTROL SIGNAL
112
EDID ROM
TMDS CHANNEL 0
TMDS CHANNEL 1
TMDS CHANNEL 2
TMDS CLOCK CHANNEL
DDC
CEC
100
101
DHMI TRANSMITTER
VIDEO SIGNAL
AUDIO SIGNAL
CONTROL SIGNAL

HORIZONTAL SYNCHRONIZING SIGNAL
VERTICAL SYNCHRONIZING SIGNAL
VBL
45 LINES
480 LINES (EFFECTIVE)
525 LINES
VIDEO SIGNAL DATA (EFFECTIVE)
HBL
138 PIXELS
720 PIXELS (EFFECTIVE)
858 PIXELS
CONTROL SIGNAL PERIOD
DATA PERIOD
VIDEO DATA PERIOD

FIG. 8

| Packet Type Value | | Packet Type |
| --- | --- | --- |
| 0x00 | | Null |
| 0x01 | | Audio Clock Regeneration (N/CTS) |
| 0x02 | | Audio Sample (L-PCM and IEC 61937 compressed formats) |
| 0x03 | | General Control |
| 0x04 | | ACP Packet |
| 0x05 | | ISRC1 Packet |
| 0x06 | | ISRC2 Packet |
| 0x07 | | One Bit Audio Sample Packet |
| 0x08 | | DST Audio Packet |
| 0x09 | | High Bitrate (HBR) Audio Stream Packet (IEC 61937) |
| 0x0A | | Gamut Metadata Packet |
| 0x80+InfoFrame Type | | InfoFrame Packet |
| | 0x81 | Vendor-Specific InfoFrame |
| | 0x82 | AVI InfoFrame |
| | 0x83 | Source Product Descriptor InfoFrame |
| | 0x84 | Audio InfoFrame |
| | 0x85 | MPEG Source InfoFrame |

DATA TRANSMISSION AND RECEPTION SYSTEM, DATA REPEATING APPARATUS, DATA RECEIVING APPARATUS, DATA REPEATING METHOD, AND DATA RECEIVING METHOD

TECHNICAL FIELD

The present invention relates to a data repeating apparatus for receiving illustratively digital contents making up video and audio signals as data according to a predetermined transmission standard and also for retransmitting the received data; to a data receiving apparatus for receiving the data transmitted from that data repeating apparatus; and to a data transmission and reception system constituted by these apparatuses. More particularly, the present invention relates to a data repeating method corresponding to the above-mentioned data repeating apparatus, and to a content data receiving method corresponding to the aforementioned data receiving apparatus.

BACKGROUND ART

The HDMI (High Definition Multimedia Interface) has been known as a data interface standard for transmitting video and audio signals (digital contents) in digital form.

As is well known, the HDMI is a standard based on the DVI (Digital Video Interface) established as a standard for connecting a personal computer with digital display devices such as a liquid crystal display device digitally driven for display, the HDMI being worked out additionally to include features such as those for audio transmission, copyright protection, and color difference transmission in order to serve as a standard for digital video and audio input and output applicable primarily to household appliances and AV (Audio Visual) devices. According to the HDMI, a transmitting (output) device is referred to as a source and a receiving (input) device as a sink. Video and audio signal data are transmitted under the HDMI not bidirectionally but unidirectionally from the source to the sink. It should be noted however that when a control signal path called DDC (Display Data Channel) is used, bidirectional communication is available.

For example, a user may set up an AV (Audio Visual) system by connecting at least two HDMI-compatible devices by means of an HDMI cable or the like (Japanese Patent Laid-Open No. 2002-311933).

However, as mentioned above, the data transmission according to the HDMI can only be unidirectional from the source to the sink. This can be a constraint on the user's attempt to build a desired AV system. For example, the user may want to have data transmitted from a device A and received by a device B, but it might happen that the device A is equipped only with an input (receiving) terminal and has no output (transmitting) terminal, or that the device B is furnished only with an output terminal and has no input terminal.

Such an inconvenience may be eliminated conceivably by providing additional receiving and transmitting terminals to the HDMI devices. At present, however, the devices and cables compatible with the HDMI are more expensive than those of other data interfaces. Thus, adding HDMI terminals indiscriminately is not preferable in terms of cost.

An object of the present invention is illustratively to provide a more flexible system which primarily adopts the unidirectional data transmission such as that according to the HDMI while also permitting typically bidirectional transmissions without fail.

DISCLOSURE OF INVENTION

In consideration of the above-mentioned object, the present invention envisages providing a data transmission and reception system as follows.

Namely, the data transmission and reception system according to the present invention is made up of a data repeating apparatus and a data receiving apparatus. The data repeating apparatus includes: first content signal receiving means for receiving a digital content signal transmitted from an external transmitting apparatus via a first transmission path; first regenerated element receiving means for receiving a first reference clock, first frequency dividing ratio information, and first frequency information, the first reference clock being generated by the external transmitting apparatus and transmitted from the external transmitting apparatus via the first transmission path along with the digital content signal, the first frequency dividing ratio information being indicative of a first frequency dividing ratio obtained by the external transmitting apparatus and set by the external transmitting apparatus so as to frequency-divide a first content signal clock corresponding to the digital content signal, the first frequency information being indicative of the frequency of the first reference clock obtained in one period of a frequency signal obtained by frequency-dividing the first content signal clock by the first frequency dividing ratio; clock regenerating means for regenerating the first content signal clock by multiplying by the first frequency dividing ratio a frequency signal obtained by frequency-dividing the first reference clock received by the first regenerated element receiving means by the frequency indicated by the first frequency information; reference clock receiving means for receiving a second reference clock which is transmitted from the data receiving apparatus via the first transmission path and which is generated by the data receiving apparatus; data transmitting means for transmitting the digital content signal, received by the first content signal receiving means, to the data receiving apparatus over a second transmission path complying with a transmission standard different from that which is complied with by the first transmission path; and regenerated element transmitting means for transmitting second frequency dividing ratio information and second frequency information over the second transmission path along with the digital content signal received by the first content signal receiving means, the second frequency dividing ratio information being indicative of a second frequency dividing ratio set so as to frequency-divide the regenerated first clock, the second frequency information being indicative of the frequency of the second reference clock obtained in one period of a frequency signal obtained by frequency-dividing the regenerated first content signal clock by the second frequency dividing ratio. And the data receiving apparatus includes: second reference clock transmitting means for transmitting the second reference clock, generated by the data receiving apparatus, to the data repeating apparatus via the first transmission path; second content signal receiving means for receiving the digital content signal transmitted from the data repeating apparatus over the second transmission path; second regenerated element receiving means for receiving the second frequency dividing ratio information and the second frequency information transmitted from the data repeating apparatus over the second transmission path; and clock generating means for generating a second content signal clock synchronized with the digital content signal received by the second content signal receiving means, by multiplying a frequency signal obtained by frequency-dividing the second reference clock by the frequency value indicated by the second frequency information, by the frequency dividing ratio indicated by the second frequency dividing ratio information.

And a data repeating apparatus of the present invention is structured as follows.

The data repeating apparatus includes: content signal receiving means for receiving a digital content signal transmitted from an external transmitting apparatus via a first transmission path; regenerated element receiving means for receiving a first reference clock, first frequency dividing ratio information, and first frequency information, the first reference clock being generated by the external transmitting apparatus and transmitted from the external transmitting apparatus via the first transmission path along with the digital audio signal, the first frequency dividing ratio information being indicative of a first frequency dividing ratio obtained by the external transmitting apparatus and set by the external transmitting apparatus so as to frequency-divide a first content signal clock corresponding to the digital content signal, the first frequency information being indicative of the frequency of the first reference clock obtained in one period of a frequency signal obtained by frequency-dividing the first content signal clock by the first frequency dividing ratio; clock regenerating means for regenerating the first content signal clock by multiplying by the first frequency dividing ratio a frequency signal obtained by frequency-dividing the first reference clock received by the regenerated element receiving means by the frequency indicated by the first frequency information; data transmitting means for transmitting the digital content signal, received by the first content signal receiving means, to the data receiving apparatus over a second transmission path complying with a transmission standard different from that which is complied with by the first transmission path; reference clock receiving means for receiving a second reference clock which is transmitted from the data receiving apparatus via the first transmission path and which is generated by the data receiving apparatus; and regenerated element transmitting means for transmitting second frequency dividing ratio information and second frequency information over the second transmission path along with the digital content signal received by the first content signal receiving means, the second frequency dividing ratio information being indicative of a second frequency dividing ratio set so as to frequency-divide the regenerated first clock, the second frequency information being indicative of the frequency of the second reference clock obtained in one period of a frequency signal obtained by frequency-dividing the regenerated first content signal clock by the second frequency dividing ratio.

Also, a data receiving apparatus of the present invention is structured as follows.

Namely, the data receiving apparatus includes: second reference clock transmitting means for transmitting a second reference clock, generated by the data receiving apparatus, to a data repeating apparatus via a first transmission path; content signal receiving means for receiving a digital content signal received by the data repeating apparatus from a transmitting apparatus over a second transmission path complying with a transmission standard different from that which is complied with by the first transmission path; regenerated element receiving means for receiving frequency dividing ratio information and frequency information transmitted from the data repeating apparatus over the second transmission path; and clock generating means for generating a content signal clock corresponding to the digital content signal received by the content signal receiving means, by multiplying a frequency signal obtained by frequency-dividing the second reference clock by the frequency value indicated by the second frequency information, by the frequency dividing ratio indicated by the frequency dividing ratio information.

In each of the above-outlined structures, the data repeating apparatus is connected to the external transmitting apparatus by the first transmission path. Also, the data repeating apparatus and the data receiving apparatus are connected not only by the first transmission path but also by the second transmission path.

In the above setup, the data repeating apparatus obtains through reception the digital content signal transmitted from the external transmitting apparatus via the first transmission path, and a first regenerated element (first frequency dividing ratio information and first frequency information) generated on the basis of the first reference clock which in turn is generated by the external transmitting apparatus. Also, the data repeating apparatus obtains through reception the second reference clock generated by the data receiving apparatus and transmitted therefrom via the first transmission path.

And by making use of the first regenerated element, the data repeating apparatus regenerates the first content signal clock corresponding to the digital content signal. The first content signal clock is a clock that is generated corresponding to the digital content signal transmitted from the external transmitting apparatus to the data repeating apparatus illustratively in an operating environment based on a reference clock. Also, the data repeating apparatus obtains the second frequency information based on the second frequency dividing ratio information set by the data repeating apparatus itself as indicative of the second frequency dividing ratio, on the second reference clock obtained through reception from the data receiving apparatus, and on the regenerated first clock.

Then, the data repeating apparatus transmits over the second transmission path the second frequency dividing ratio information and second frequency information to the data receiving apparatus along with the digital audio signal received from the external transmitting apparatus. This implements data transmission from the data repeating apparatus to the data receiving apparatus.

The data receiving apparatus generates the second content signal clock using the second reference clock as well as the second frequency dividing ratio information and second frequency information received along with the digital audio signal. Because it is generated using the second reference clock, the second content signal clock is used to process illustratively the received digital audio signal in an operating environment based on the second reference clock.

As described above, the present invention makes it possible to transmit the digital content signal received by the data repeating apparatus to the data receiving apparatus via the second transmission path that complies with a transmission standard different from that which is complied with by the first transmission path. Illustratively, if the components constituting the second transmission path are made less expensive than those constituting the first transmission path, then the digital content signal can be transmitted from the data repeating apparatus to and received by the data receiving apparatus at a lower cost than if the components making up the first transmission path were additionally furnished for such transmission and reception. It follows that where the first transmission path supports only unidirectional transmission from the transmitting side to the receiving side, adding the second transmission path can implement bidirectional data transmission at a reduced cost.

In the above setup, the data receiving apparatus of the present invention generates the second content signal clock as described, so that the data receiving apparatus can process the received digital content signal in its own operating environment based on the second reference clock. In other words, even if the digital content signal that should primarily be transmitted via the first transmission path is transmitted instead over the second transmission path, the digital content signal receiving side can still process the digital content signal unfailingly. The reliability of the data transmission and reception system including the data repeating apparatus and data receiving apparatus according to the present invention thus remains intact.

BRIEF DESCRIPTION OF DRAWINGS

FIG. 2 is a view showing a typical HDMI-based system configuration formed by adding another DVD reproducing device to the configurations in FIG. 1.

FIG. 8 is a view listing the definitions of the packet types stipulated by the HDMI.

BEST MODE FOR CARRYING OUT THE INVENTION

The best mode for carrying out the present invention presupposes a system configuration based on the HDMI (High Definition Multimedia Interface) for video and audio signal transmission.

Figure 1:
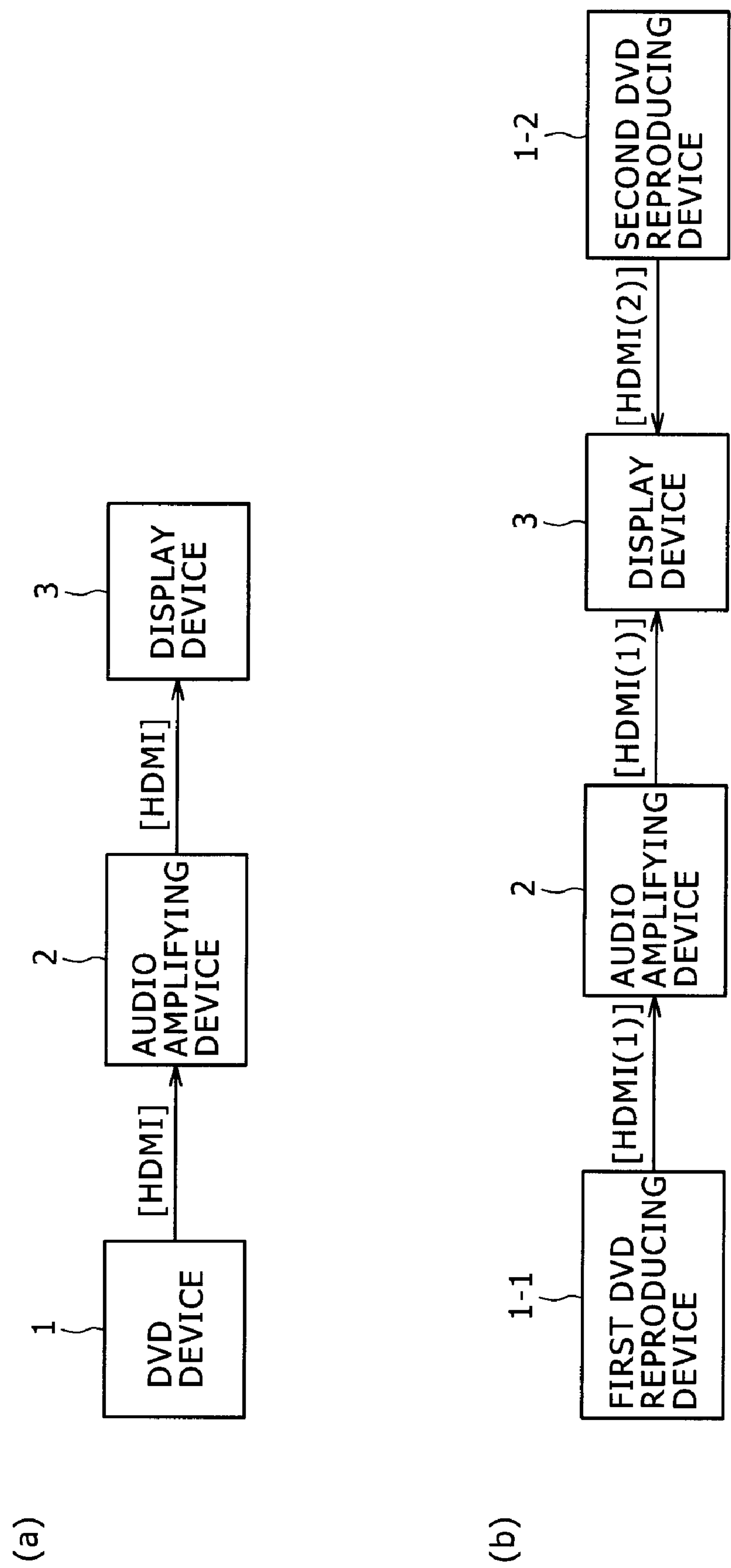
FIG. 1 is views showing typical HDMI-based system configurations.

FIGS. 1(*a*) and 1(*b*) each show a typical AV system constituted by use of the HDMI.

To begin with, the system configuration shown in FIG. 1(*a*) is made up of a DVD reproducing device 1, an audio amplifying device 2, and a display device 3.

The DVD reproducing device 1 is capable of reproducing a video/audio signal (indicating both the video signal and the audio signal to be synchronized with the video signal in terms of reproduction time in this case) from a DVD (Digital Versatile Disc) to which reproducing operations are performed and on which content data typically composed of video and audio data have been recorded. In this case, an HDMI output terminal of the DVD reproducing device 1 is connected with an HDMI input terminal of the audio amplifying device 2 under the HDMI, whereby the video/audio signal data reproduced by the DVD reproducing device 1 can be transmitted to the audio amplifying device 2.

The audio amplifying device 2 is capable of performing predetermined reproduction signal processing and amplification on the audio signal input from the HDMI input terminal, and of outputting the processed signal illustratively through speakers (not shown here) for acoustic reproduction.

And the audio amplifying device 2 in the above setup is also furnished with an HDMI output terminal, allowing the video/audio signal input from the HDMI input terminal to be passed on for output. In this case, the HDMI output terminal of the audio amplifying device 2 is connected to the HDMI input terminal of the display device 3, so that the audio amplifying device 2 can transmit to the display device 3 the data constituting the video/audio signal input from the HDMI input terminal.

The display device 3 in the above setup enables a display panel to display pictures derived from the video signal out of the video/audio signal input from the HDMI input terminal.

Thus, the system shown in FIG. 1(*a*) is configured to get the DVD reproducing device 1 to reproduce pictures and sounds (i.e., video/audio signal) from the DVD, the display device 3 to display the pictures, and the audio amplifying device 2 to amplify the sounds for acoustic output illustratively through speakers.

Next, FIG. 1(*b*) shows a new system configuration formed by supplementing the system configuration of FIG. 1(*a*) illustratively with a source device such as a DVD reproducing device.

In FIG. 1(*b*), the DVD reproducing device 1 shown in FIG. 1(*a*) is presented as a first DVD reproducing device 1-1. The HDMI-based connection arrangements between the first DVD reproducing device 1-1, audio amplifying device 2, and display device 3 are the same as those in FIG. 1(*a*).

In the above setup, a second DVD reproducing device 1-2 is provided anew. And the HDMI output terminal of the second DVD reproducing device 1-2 is connected with the HDMI input terminal of the display device 3.

The system configuration of FIG. 1(*b*) may be implemented illustratively where the audio amplifying device 2 has only one HDMI input terminal but the display device 3 has a plurality of HDMI input terminals in the configuration of FIG. 1(*a*).

It is to be noted that, in FIG. 1(*b*), as in FIG. 1(*a*), the first DVD reproducing device 1-1 is connected to the audio amplifying device 2 which in turn is connected to the display device 3 using an HDMI transmission path which will be referred to as the HDMI(1) transmission path. The second DVD reproducing device 1-2 is connected anew to the display device 3 using an HDMI transmission path which will be referred to as the HDMI(2) transmission path.

In the system configuration shown in FIG. 1(*b*), the pictures and sounds (i.e., video/audio signal) obtained by the second DVD reproducing device 1-2 through reproduction are output to the display device 3 via the HDMI(2) transmission path. Therefore, the display device 3 can display the pictures reproduced by the second DVD reproducing device 1-2. However, it is assumed that the display device 3 in this setup has no HDMI output terminal or that the audio amplifying device 2 does not have two or more HDMI input terminals.

Under the above-described conditions, the sounds (i.e., audio signal) reproduced by the second DVD reproducing device 1-2 cannot be output from the display device 3 to the audio amplifying device 2 via the HDMI(1) transmission path. That is, in the configuration of FIG. 1(*b*), the sounds reproduced by the second DVD reproducing device 1-2 cannot be reproduced and output by the audio amplifying device 2.

For example, if the display device 3 is structured to have at least the audio reproduction capability, then the display device 3 can reproduce and output sounds along with pictures. However, if the sounds reproduced by the first DVD reproducing device 1-1 can be reproduced and output by the audio amplifying device 2 but not the sounds reproduced by the second DVD reproducing device 1-2, then such a system cannot be considered complete.

It should be noted that bidirectional communication is available for DDC (Display Data Channel) and CEC (Consumer Electric Control) under the HDMI but not for video and audio signal data, the main body of transmission data that can only be transmitted unidirectionally according to the HDMI.

One of the most natural solutions to the aforementioned problem with the system configuration of FIG. 1(*b*) is to increase the number of HDMI output terminals (i.e., transmitting devices) on the display device 3 or the number of HDMI input terminals (i.e., receiving devices) on the audio amplifying device 2. Realistically, however, the HDMI is significantly more expensive than many other data interfaces capable of transmitting pictures and sounds. It follows that the larger the number of HDMI terminals furnished, the higher the cost to be borne eventually by the user. In particular, HDMI-based cables for connecting the terminals are very expensive. To additionally furnish HDMI terminals to be utilized by the user can therefore translate immediately into the corresponding financial burdens to be shouldered by the user.

Thus the embodiment of the present invention is structured as shown in FIG. 2, based on the system configuration of FIG. 1(*b*).

The system embodying the present invention as shown in FIG. 2, like the system in FIG. 1(*b*), includes the first DVD reproducing device 1-1, audio amplifying device 2, display device 3, and second DVD reproducing device 1-2. Also, the connection arrangements involving the HDMI(1) transmission path and HDMI(2) transmission path (first transmission path) are the same as those in FIG. 1(*b*).

In the system of FIG. 2, the display device 3 and audio amplifying device 2 are further connected by an auxiliary transmission path 4 (second transmission path) as well. That is, the display device 3 and audio amplifying device 2 of this embodiment are structured to be communicable with each other through the auxiliary transmission path 4. The display device 3 and the audio amplifying device 2 correspond to the data repeating apparatus and the data receiving apparatus according to the present invention, respectively.

In the above setup, the auxiliary transmission path 4 of this embodiment is structured at least in a manner capable of retransmitting the audio signal data received and obtained through the HDMI. The display device 3 in FIG. 2 is structured so that the audio signal data received from the second DVD reproducing device 1-2 through the HDMI will be transmitted to the audio amplifying device 2 via the auxiliary transmission path 4. Also, the audio amplifying device 2 is structured to process the audio signal received via the auxiliary transmission path 4 for reproduction and output in the same manner as the audio signal received by the audio amplifying device 2 itself through the HDMI. This makes it possible for the audio amplifying device 2 to reproduce and output acoustically the audio signal data that has been reproduced by the second DVD reproducing device 1-2.

That is, this embodiment is furnished with the auxiliary transmission path 4 paired with the HDMI(1) transmission path for transmitting the video signal from the audio amplifying device 2 to the display device 3, the auxiliary transmission path 4 permitting audio signal transmission from the display device 3 to the audio amplifying device 2. This makes it possible to transmit the audio signal from the display device 3 to the audio amplifying device 2 without recourse to additional HDMI input/output features. This also means that content data can be transmitted bidirectionally between the audio amplifying device 2 and the display device 3.

Here, the data interface that can be adopted as the auxiliary transmission path 4 needs only be capable of transmitting at sufficiently high speeds the digital audio signal in expected formats for transmission; the data interface should not be limited otherwise.

Given the earlier explanation, however, the data interface will have to be less expensive than the HDMI in practice. From that point of view, it will be reasonable to adopt the IEEE 1394. It is also possible to adopt a network interface such as the Ethernet (registered trademark).

Explained below is how the system shown in FIG. 2 is configured illustratively with the first DVD reproducing device 1-1, second DVD reproducing device 1-2, audio amplifying device 2, and display device 3.

Figure 3:
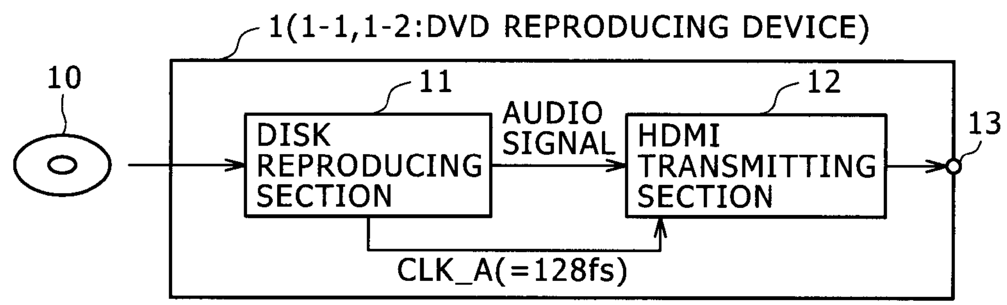
FIG. 3 is a view showing a typical structure of the DVD reproducing device.

It is to be noted that the first DVD reproducing device 1-1 and the second DVD reproducing device 1-2 have a common structure and thus are shown as the DVD reproducing device 1 in FIG. 3.

The structure of the DVD reproducing device 1 shown in FIG. 3 will now be explained below.

It is to be noted that, for purpose of simplification and illustration, FIG. 3 shows only those components of the DVD reproducing device 1 which reproduce video contents recorded on the DVD in order to obtain a video/audio signal and transmit the obtained signal through the HDMI for output. In other words, the DVD reproducing device 1 may also be structured to reproduce a signal from the CD or other disk-like recording media and output the reproduced signal to the outside in accordance with a predetermined standard. Alternatively, the DVD reproducing device 1 may be structured to output the video signal and audio signal reproduced from the disk-like recording medium to the outside through a transmission path other than the HDMI. The setup of FIG. 3, however, does not include such alternative structures.

A disk-like recording medium 10, which is a DVD loaded in the DVD reproducing device 1, has its video contents (i.e., recorded video/audio signal) read out (reproduced) by a disk reproducing section 11. The disk reproducing section 11 is constituted illustratively by a part for rotatively driving the loaded DVD according to a predetermined rotative driving method, by an optical pickup for reading recorded signals from the DVD by emitting a laser beam thereto, and by a circuit part serving as a reproduction signal processing section carrying out predetermined signal processing for eventually obtaining the video/audio signal from the recorded signals that have been retrieved.

The video/audio signal obtained by the disk reproducing section 11 is input to an HDMI transmitting section 12. The HDMI transmitting section 12 turns the input video/audio signal into a transmission signal according to the HDMI standard and outputs the transmission signal to an HDMI output terminal 13. The HDMI output terminal 13 is illustratively made of a female plug structured to comply with the physical layer specifications of the HDMI, and accommodates a male plug attached to one end of an HDMI-compatible cable. When the plug at the other end of that cable is connected to another device, the DVD reproducing device 1 transmits to that device the video/audio signal that has been read and obtained from the DVD.

In the above setup, the disk reproducing section 11 outputs to the HDMI transmitting section 12 an audio clock CLK_A (CLK_A1 for the first DVD reproducing device 1-1, CLK_A2 for the second DVD reproducing device 1-2). Under the HDMI, the audio clock CLK_A is used for ACR (Audio Clock Regeneration). This is a clock that synchronizes with the audio signal reproduced from the DVD by the disk reproducing section 11, and the clock has a frequency of 128 fs, where fs stands for the sampling frequency of the reproduced audio signal. The disk reproducing section 11 in this setup generates a reproduction clock in synchronism with the audio signal read out and reproduced from the DVD subjected to reproducing operations. In this case, the above-mentioned audio clock CLK_A of 128 fs is generated on the basis of the reproduction clock, and the generated clock is input to the HDMI transmitting section 12.

Figure 4:
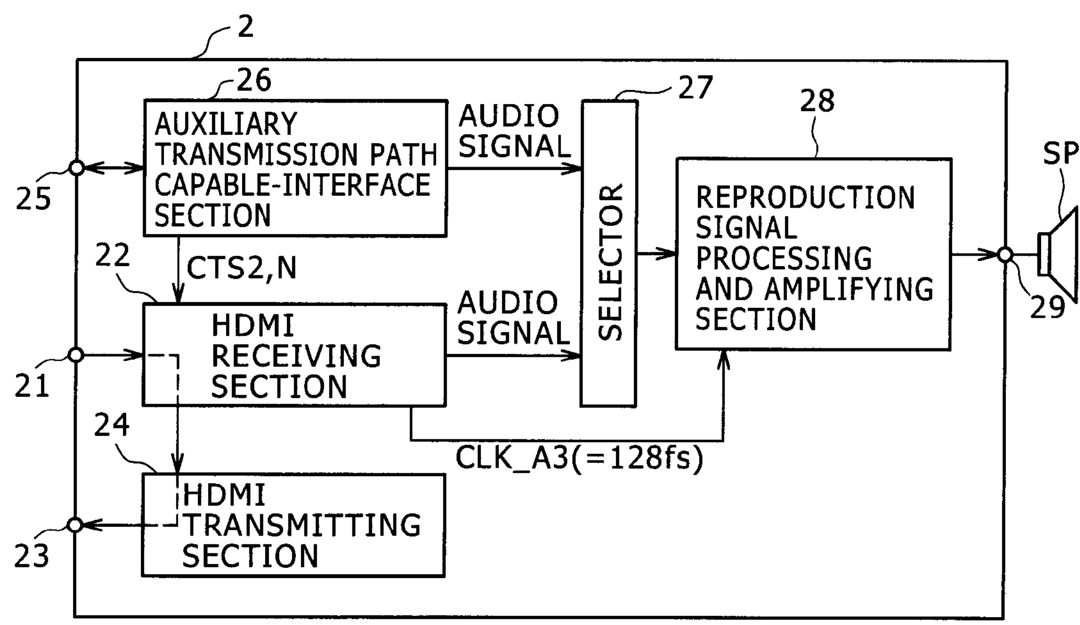
FIG. 4 is a view showing a typical structure of an audio amplifying device.

FIG. 4 shows a typical structure of the audio amplifying device 2.

It is to be noted that, for purpose of simplification and illustration, the structure of the audio amplifying device 2 in FIG. 4 is shown constituted only by excerpted parts for implementing the data interface capability complying with the HDMI and corresponding to the auxiliary transmission path 4 as well as excerpted parts for reproducing the audio signal for output as sounds through speakers.

The audio amplifying device 2 includes an HDMI input terminal 21, an HDMI receiving section 22, an HDMI output terminal 23, and an HDMI transmitting section 24 as HDMI-related parts. Also, the HDMI input terminal 21 and HDMI output terminal 23 actually have a female plug each in compliance with the physical layer specifications of the HDMI.

The signal transmitted from the device connected to the HDMI input terminal 21 via a cable is input to the HDMI receiving section 22 as a reception signal. The HDMI receiving section 22 performs reception processing on the input reception signal, thereby extracting and reconstructing the audio signal included in the reception signal. The HDMI receiving section 22 outputs the audio signal thus obtained to a selector 27.

Also, the HDMI receiving section 22 can output the input reception signal as is to the HDMI transmitting section 24.

The signal received as described above by the audio amplifying device 2 can again be output by the HDMI transmitting section 24 as a transmission signal through the HDMI output terminal 23.

Also, an auxiliary transmission path-capable interface section 26 is a part which is actually adopted as the auxiliary transmission path 4 in compliance with the data interface standard and which permits communicating operations between an interface (I/F) terminal 25 on the one hand and the auxiliary transmission path-capable interface section of the opposite device connected through the terminal 25 on the other hand.

And if audio signal data is included in the signal transmitted to the audio amplifying device 2 via the auxiliary transmission path 4, then the auxiliary transmission path-capable interface section 26 extracts the audio signal data from the reception signal and outputs the extracted data to the selector 27.

The selector 27 performs switching operations to select one of two audio signal data output from the auxiliary transmission path-capable interface section 26 and from the HDMI receiving section 22, and inputs the selected audio signal data to a reproduction signal processing and amplifying section 28.

The reproduction signal processing and amplifying section 28 performs reproduction signal processing conforming to the format of the input audio signal data, carries out amplifying operations on the signal having undergone the reproduction signal processing, and outputs a speaker driving signal obtained through amplification to speaker terminals 29. The speaker driving signal drives the speakers SP connected to the speaker terminals 29, whereby the audio signal input to the audio amplifying device 2 is reproduced and output as sounds.

With this embodiment, the HDMI receiving section 22 further outputs an audio clock CLK_A3 to the reproduction signal processing and amplifying section 28. The audio clock CLK_A3 synchronizes with the audio signal output from the same HDMI receiving section 22 and has the clock frequency of 128 fs, where fs stands for the sampling frequency of the audio signal.

Figure 5:
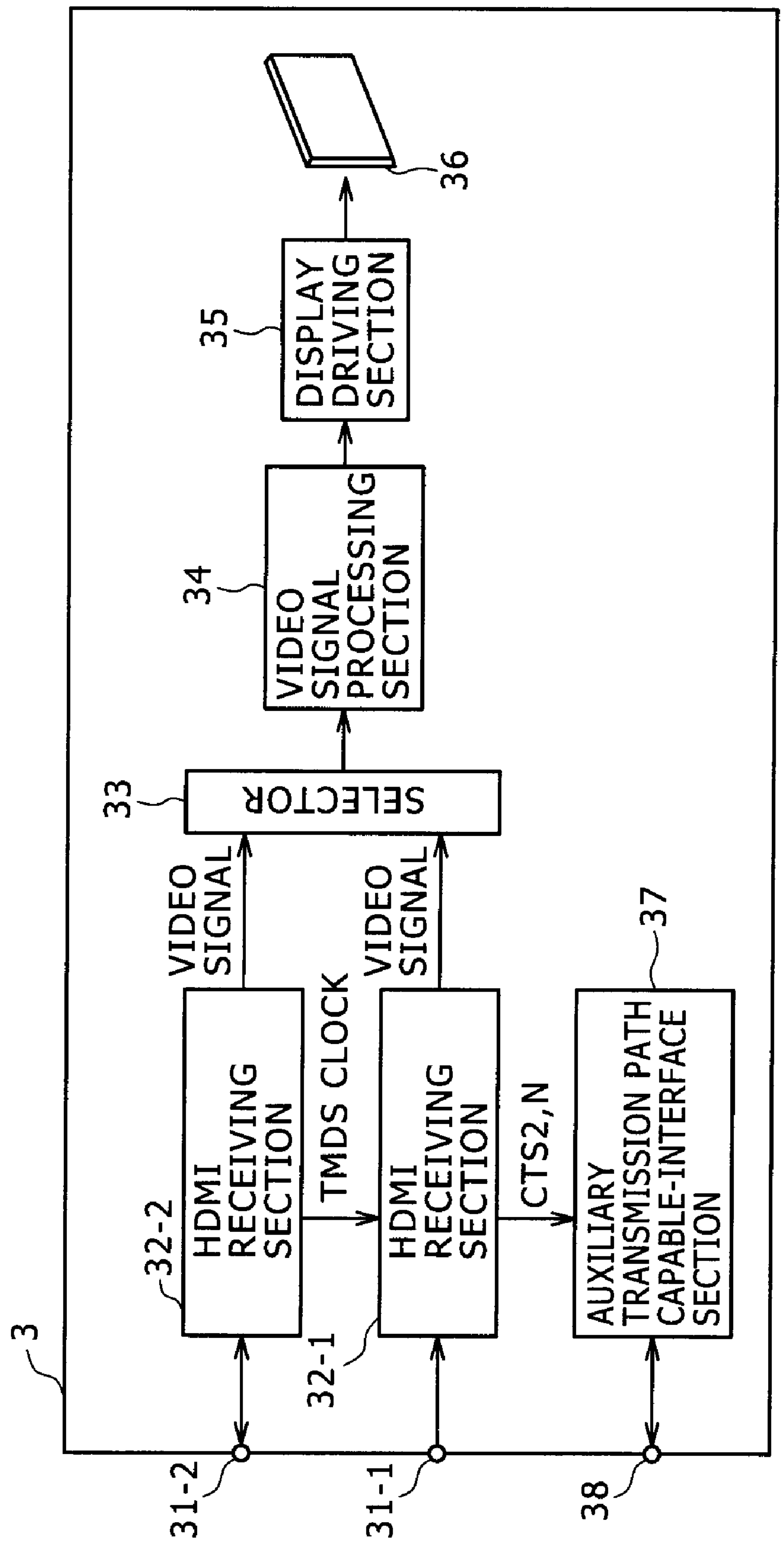
FIG. 5 is a view showing a typical structure of a display device.

FIG. 5 shows a typical structure of the display device 3. It is to be noted that, for purpose of simplification and illustration, the structure in FIG. 5 is also shown constituted only by excerpted parts for implementing the data interface capability complying with the HDMI and corresponding to the auxiliary transmission path 4 as well as excerpted parts for reproducing the video signal for output as pictures.

To begin with, two reception blocks are provided in relation to the HDMI interface. Namely, there are provided HDMI receiving sections 32-1 and 32-2 along with HDMI input terminals 31-1 and 31-2 corresponding to the two sections, respectively.

The HDMI receiving section 32-1 reconstructs the video signal by performing reception processing on the transmission signal input from an external device through the HDMI input terminal 31-1, and outputs the reconstructed video signal to a selector 33.

Likewise, the HDMI receiving section 32-2 reconstructs the video signal by carrying out reception processing on the transmission signal input from an external device through the HDMI input terminal 31-2, and outputs the reconstructed video signal to the selector 33.

Given the two video signals input as described above, the selector 33 selects one of the signals and outputs the selected video signal to a video signal processing section 34.

The video signal processing section 34 performs necessary video signal processing on the input video signal for display and reproduction. Illustratively, the video signal processing section 34 generates eventually a display-ready video signal and outputs the generated signal to a display driving section 35.

Using the input display-ready video signal, the display driving section 35 illustratively drives a flat-type display panel section 36. This causes the video signal received by the display device 3 to be reproduced and displayed as pictures. It is to be noted that the display device to be actually adopted as the display panel section 36 should not be limited to any specific type of device. At present, the display device may illustratively be a liquid crystal display, a plasma display, an organic EL (electroluminescence) display, or an FED (Field Emission Display). As another alternative, the display panel section 36 may be replaced by a cathode-ray tube.

An auxiliary transmission path-capable interface section 37, like the aforementioned auxiliary transmission path-capable interface section 26 of the audio amplifying device 2, is a part which is actually adopted as the auxiliary transmission path 4 in compliance with the data interface standard and which permits communicating operations between an interface (I/F) terminal 38 on the one hand and the auxiliary transmission path-capable interface section of the opposite device connected through the terminal 38 on the other hand.

Below, the connection arrangements of the system in FIG. 2 are shown corresponding to those of the terminals of the devices indicated in FIGS. 3 through 5.

First of all, the HDMI output terminal 13 of the first DVD reproducing device 1-1 is connected to the HDMI input terminal 21 of the audio amplifying device 2.

Also, the HDMI output terminal 23 of the audio amplifying device 2 is connected to the HDMI input terminal 31-1 of the display device 3.

Also, the other HDMI input terminal 31-2 of the display device 3 is connected to the HDMI output terminal 13 of the second DVD reproducing device 1-2.

And the interface terminal 25 of the display device 3 is connected to the interface terminal 38 of the audio amplifying device 2.

Figure 6:
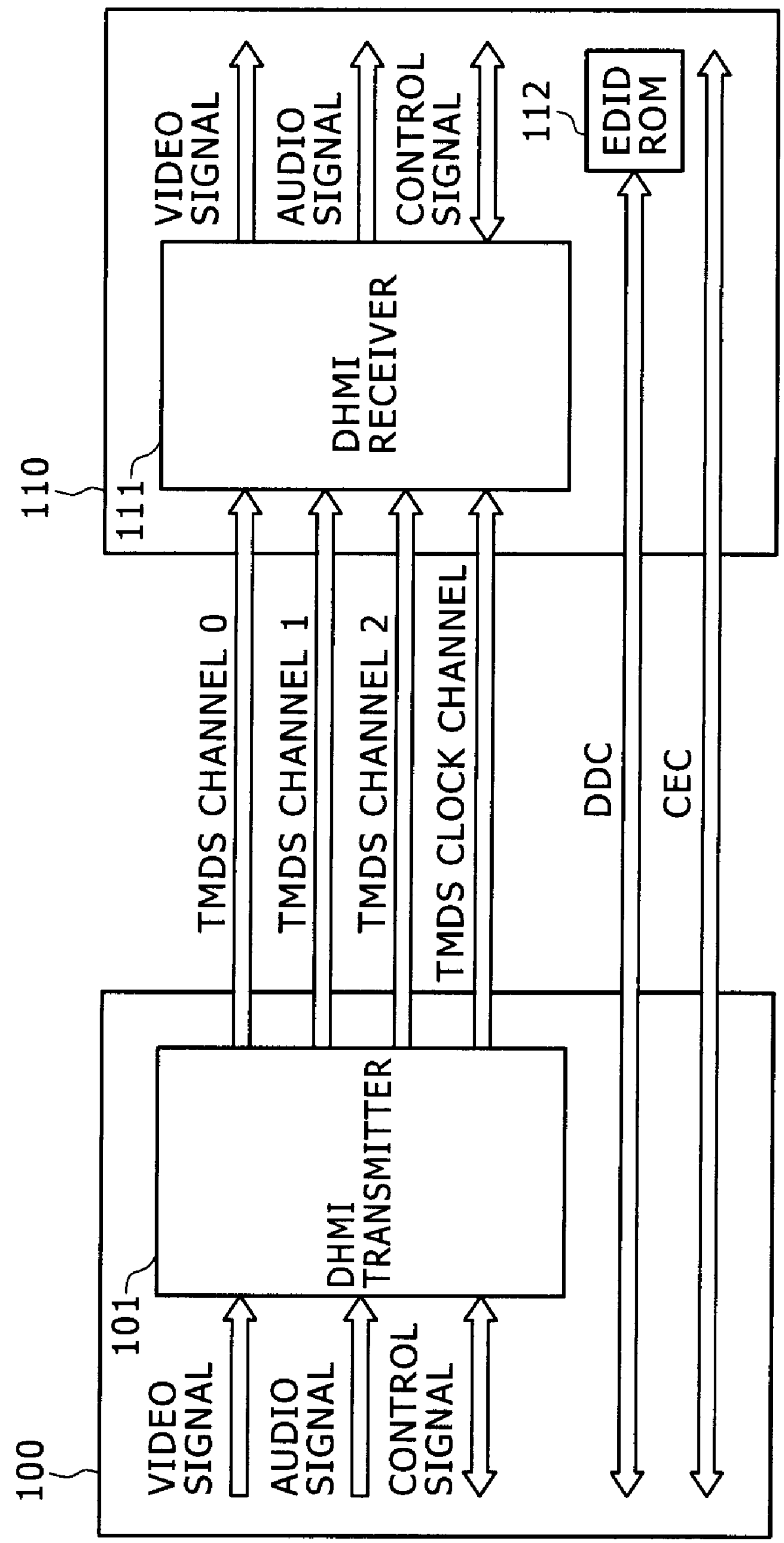
FIG. 6 is a view showing schematically the basic structure for data transmission and reception according to the HDMI.

FIG. 6 schematically shows a basic HDMI structure for data transmission and reception.

As discussed briefly above, the transmission of content data (video signal data, audio signal data) between two devices complying with the HDMI is not bidirectional but unidirectional. And the transmitting device is referred to as the source and the receiving device as the sink.

In FIG. 6, an HDMI source 100 and an HDMI sink 110 are shown corresponding to the transmitting device and the receiving device, respectively.

In the HDMI source 100, an HDMI transmitter 101 inputs the content data (video signal, audio signal) to be transmitted, and puts these input signals into a predetermined structure to generate transmission data. Also, the structure of the transmission data contains additional information such as diverse control data according to the rules of the HDMI. Then the transmission data obtained in this manner is converted to a transmission signal according to the TMDS (Transition Minimized Differential Signaling), and is transmitted over a three-channel transmission path of TMDS channels 0, 1 and 2 in parallel for output.

Also, a TMDS clock channel is furnished as a transmission channel that transmits for output a TMDS clock in synchronism with the video signal data transmitted over the above-mentioned TMDS channels 0 through 2. That is, the signals making up content data and the clock are transmitted individually over separate channels (i.e., signal lines).

In the HDMI sink 110, an HDMI receiver ill receives the data transmitted over the TMDS channels 0, 1 and 2 as well as the clock sent over the TMDS channel clock. From the data received over the TMDS channels 0, 1 and 2, the HDMI receiver 111 extracts and reconstructs the video signal and audio signal for output. Also, the additional information is extracted from the received data and is output. The extracted additional information is used for control purposes illustratively by an actual device to which the HDMI sink 110 corresponds. In this manner, the HDMI transmitter 101 and the HDMI receiver 111 exchange therebetween the video signal and audio signal (as well as control signals (Control/Status)) in compliance with the TMDS standard.

In parallel with the communication between the above-mentioned HDMI transmitter 101 and HDMI receiver 111, communications based on DDC (Display Data Channel) are also carried out between the HDMI source 100 and the HDMI sink 110. This makes it possible for the HDMI source 100 to recognize various settings (e.g., settings stipulated by the EDID (Extended Display Identification Data)) which are retained illustratively in an EDID ROM 112 held illustratively by the HDMI sink 110 and which correspond to the actual device acting as the HDMI sink 110.

Also, the HDMI further stipulates that bidirectional communications are to be optionally available under the CEC (Consumer Electronics Control). The CEC is a protocol that permits exchanges of device control signals such as commands for remote controller operations between the relevant parts of the actual device serving as the HDMI source 100 on the one hand and those of the actual device acting as the HDMI sink 110 on the other hand.

Figure 7:
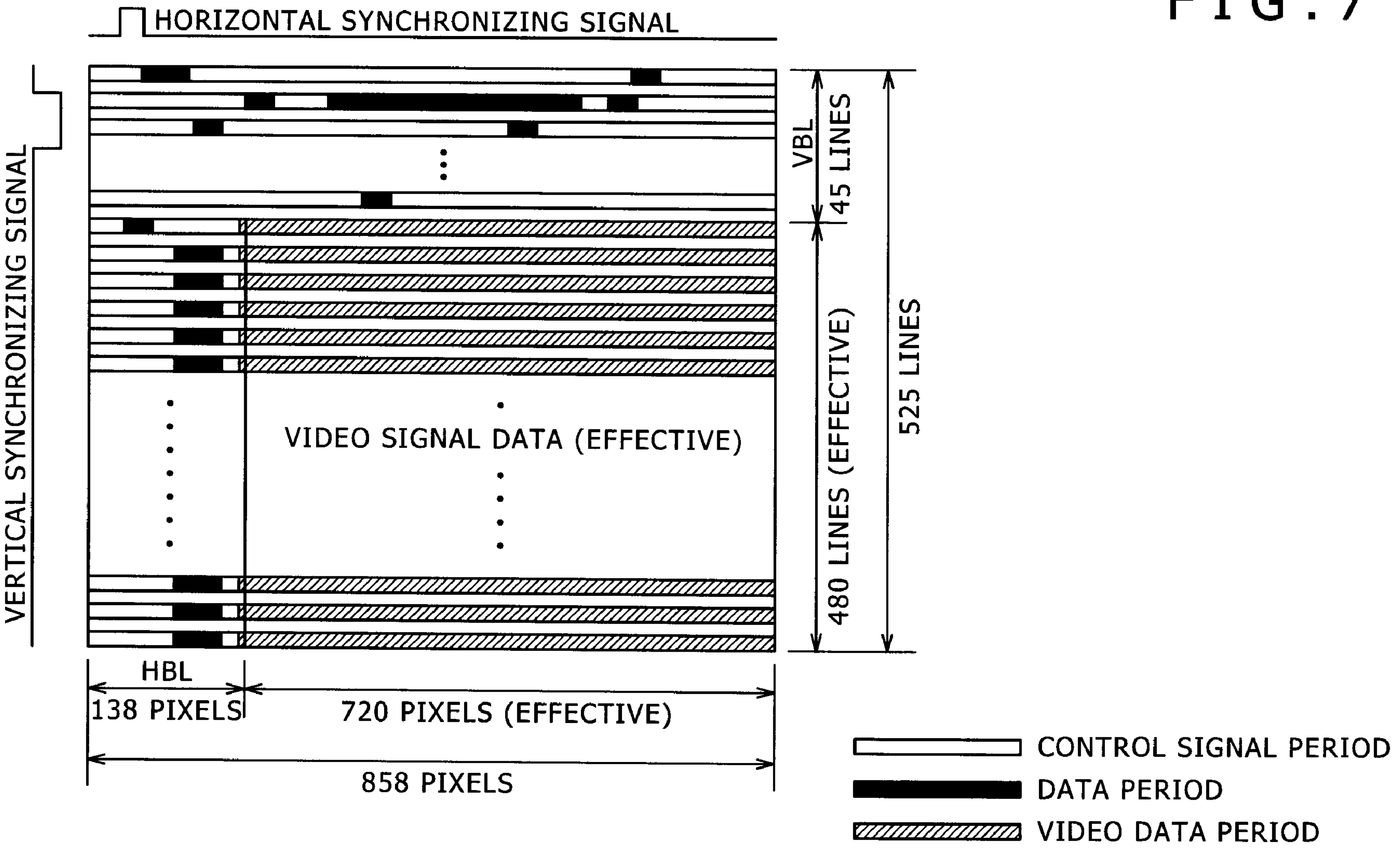
FIG. 7 is a view showing the structure of data transmitted in units of video signal frames over TDMS channels 0, 1, 2 under the HDMI.

FIG. 7 shows how the structure of the data transmitted over the TDMS channels 0, 1 and 2 under the HDMI is viewed in units of video signal frames. It is to be noted that the frame structure shown in FIG. 7 corresponds to the video signal of which the format is made up of 720 by 480 pixels per frame.

The overall structure of each frame in the above picture size includes 525 horizontal lines each consisting of a total of 858 horizontal pixels.

Each horizontal line made up of 858 horizontal pixels in total includes a horizontal blanking period (HBL) of 138 pixels followed by video signal data (effective video signal data) corresponding to an effective picture of 720 pixels. As illustrated, the horizontal synchronizing signal corresponds to a predetermined range of pixels in the horizontal blanking period.

In the vertical direction, the first 45 out of the 525 horizontal lines constitute a vertical blanking period (VBL) followed by 480 lines corresponding to the effective picture.

On each of 480 horizontal lines ranging from the 46th to the 525th line, the video signal data (pixel data) is placed in a pixel range starting illustratively from a predetermined pixel near the end of the horizontal blanking period and ending at the 858th pixel (video data period), as illustrated. Of the video signal data arranged in this manner, those data placed in the range corresponding to the above-mentioned effective picture constitute the effective picture.

Also, the control signals such as a preamble and horizontal/vertical synchronizing signals are to be placed in the positions stipulated as making up the control signal period (Control Period) in the vertical and horizontal blanking periods as illustrated.

Also stipulated likewise are those positions in the vertical and horizontal blanking periods which make up the data period (Data Island Period) for accommodating audio signal data and diverse additional information such as copyright protection information and ACR data.

According to the HDMI, the data and the additional information placed in the above-mentioned data period are each packetized before being transmitted.

The packets of the data placed in the data period (data packets) are each composed of a header and a packet body. A one-byte packet type field located in a predetermined position of the header indicates the type of the data contained in the body of the packet in question.

FIG. 8 lists the definitions of the aforementioned packet types according to the HDMI. Of the listed definitions, those related to this embodiment are explained below.

For example, if the packet type value is 0x02 (0x indicates hexadecimal notation), that means the packet contains the sample data of a compressed audio signal in the linear PCM format or in the IEC61937 format (Audio Sample (L-PCM and IEC61937 compressed formats)).

Also, if the packet type value is 0x07, that means the packet contains audio signal sample data in one-bit format (One Bit Audio Sample Packet) in the packet body.

If the packet type value is 0x08, that means the packet contains an audio signal in the DST (Digital Stream Transfer) format (i.e., DST Audio Packet).

If the packet type value is 0x09, that means the packet contains an audio signal in the HBR format defined illustratively by the IEC61937 (i.e., High Bitrate (HBR) Audio Stream Packet (IEC61937)).

As described, the HDMI stipulates that audio signal data should be transmitted using the data period.

Also, the packet type value set to 0x01 indicates that the packet in question transmits N and CTS (Cycle Time Stamp) as the data (parameters) needed to regenerate the audio clock in an operation called ACR (Audio Clock Regeneration). The ACR operation will be discussed later.

With this embodiment, as described above in reference to FIG. 2, the communication using the auxiliary transmission path 4 is made possible between the display device 3 and the audio amplifying device 2. That in turn makes it possible to transmit the audio signal coming from the second DVD reproducing device 1-2 to the display device 3 through the HDMI to the audio amplifying device 2 via the auxiliary transmission path 4 for audio reproduction. This feature will be explained below in more detail.

First, data is to be transmitted in packets over the auxiliary transmission path 4.

Figure 9:
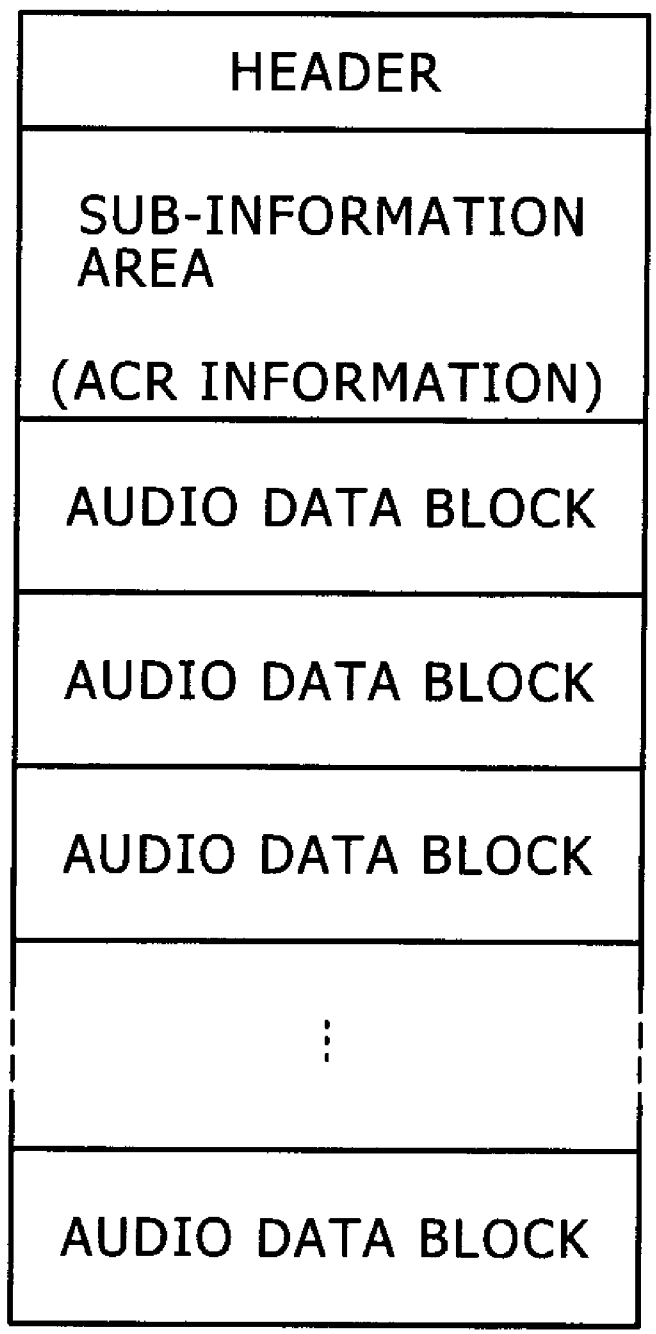
FIG. 9 is a view showing a typical packet structure for transmission of audio signal data over an auxiliary transmission path.

FIG. 9 shows a typical structure of the audio signal to be transmitted in packets over the auxiliary transmission path 4 (i.e., auxiliary transmission path packets). It is to be noted that the structure of the auxiliary transmission path packet shown in FIG. 9 is only an example.

The auxiliary transmission path packet shown in FIG. 9 is made up of a header, a sub-information area, and audio data blocks that contain audio data in predetermined units.

The header illustratively contains the size of the packet in question, information as to whether or not copyright protection is in place, and diverse basic information regarding this packet.

The sub-information area illustratively contains more detailed accompanying information regarding the packet in question. And since the audio signal data to be transmitted in this case should primarily be transmitted through the HDMI, diverse additional information to be transmitted using the data period according to the HDMI is also contained in the sub-information area. The additional information includes N and CTS information corresponding to the ACR (i.e., ACR information).

Also, the audio data blocks in the case above are formed in a manner carrying the packets to be transmitted illustratively through the HDMI. This makes it easy to reprocess according to the HDMI the audio signal data received illustratively via the auxiliary transmission path 4.

Also, as will be understood from the explanation with regard to FIG. 2, the audio signal data transmitted from the display device 3 to the audio amplifying device 2 via the auxiliary transmission path 4 was originally transmitted from the second DVD reproducing device 1-2 to the display device 3 through the HDMI(2) transmission path. During audio signal transmission under the HDMI, the sink side performs a control operation called ACR (Audio Clock Regeneration) whereby the clock used for reproduction processing of the audio signal (i.e., audio clock) is regenerated on the basis of the TMDS clock and ACR information (N/CTS) transmitted from the source side. It is to be noted that, as will be understood from the ACR operation to be discussed later, the frequency of the TMDS clock may be regarded as the transmission frequency of the audio signal transmitted via the HDMI transmission path.

Suppose now that the above-described ACR control defined by the HDMI is applied unmodified to the system of FIG. 2. In this case, the display device 3 regenerates an audio clock based on the TMDS clock and ACR information transmitted from the second DVD reproducing device 1-2 via the HDMI(2) transmission path, the regenerated audio clock being used for processing the audio signal data transmitted from the second DVD reproducing device 1-2 through the HDMI(2) transmission path. The audio clock regenerated as described by the display device 3 under ACR control of the HDMI(2) transmission path block will be referred to as the audio clock 2 hereunder. Meanwhile, the audio amplifying device 2 functions as the sink when data transmission takes place from the first DVD reproducing device 1-1 via the HDMI(1) transmission path. Therefore, ACR control is performed based on the TMDS clock and ACR information transmitted over the HDMI(1) transmission path. The audio clock regenerated as described by the display device 3 under ACR control of the HDMI(1) transmission path block will be referred to as the audio clock 1 hereunder.

The audio signal data received by the audio amplifying device 2 from the display device 3 via the auxiliary transmission path 4 is obtained as a signal synchronized with the audio clock 2. On the other hand, since it is the audio clock 2 that can be generated by the audio amplifying device 2 itself, the audio amplifying device 2 reproduces the audio signal data received from the display device 3 by use of the audio clock CLK_1.

In the case above, there is no problem if the audio clocks CLK_1 and CLK_2 have the same frequency. In practice, however, there is no guarantee that the TMDS clocks transmitted over different HDMI transmission paths would have the same clock frequency (cycle velocity); they may well be different from each other. In reality, if the TMDS clocks transmitted through the HDMI(1) and HDMI(2) have different clock frequencies, then the audio clocks CLK_1 and CLK_2 have different frequencies as well. In such a state, there will develop a discrepancy between the transmission frequency of the audio signal data (CLK_2) received by the audio amplifying device on the one hand and the clock (CLK_1) for processing the received data on the other hand. As a result, the reproduction signal processing performed by the audio amplifying device 2 becomes less accurate and can possibly lead to deteriorated quality of reproduced sounds.

Figure 10:
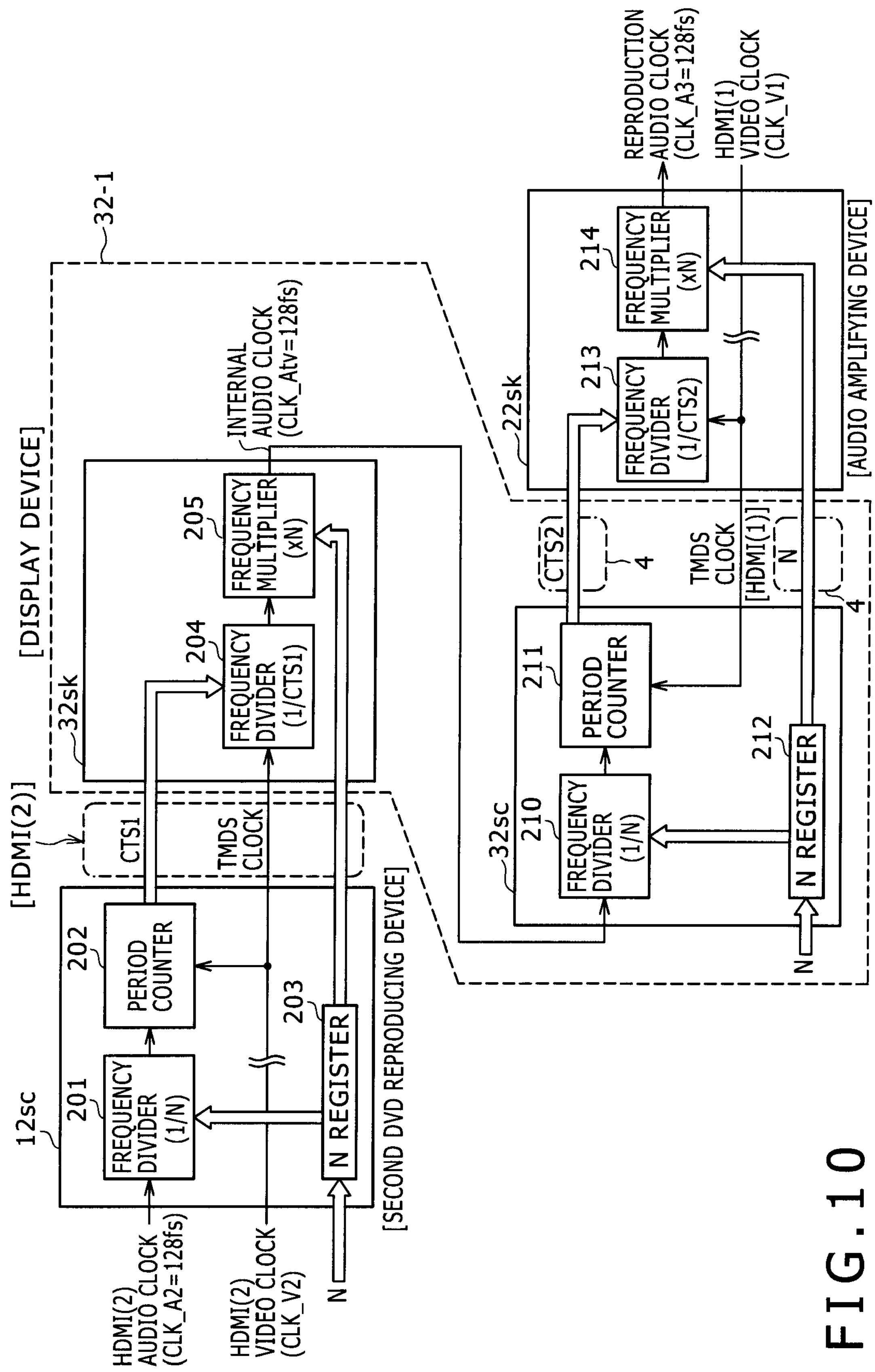
FIG. 10 is a block diagram showing a typical structure of ACR control for the display device and audio amplifying device embodying the present invention.

In order to bypass the above-mentioned problem, this embodiment is structured as shown in FIG. 10 with regard to the ACR control of the display device 3 and audio amplifying device 2.

FIG. 10 shows a typical structure of ACR control whereby the DVD reproducing device 1-2 transmits audio signal data to the display device 3 via the HDMI(1) transmission path and the display device 3 transmits the received audio signal data to the audio amplifying device 2 via the auxiliary transmission path 4.

Shown in this view are a source device section 12*sc*, a sink device section 32*sk*, a source device section 32*sc*, and a sink device section 22*sk*.

The source device section 12*sc* represents the structure of the source device contained in the HDMI transmitting section 12 of the second DVD reproducing device 1-2 for ACR control purposes.

The sink device section 32*sk* represents the structure of the sink device contained in the HDMI receiving section 32-1 of the display device 3 for ACR control purposes.

As with the above-mentioned sink device section 32*sk*, the source device section 32*sc* is contained in the HDMI receiving section 32-1 of the display device 3. As will be understood from the explanation above, the source device section 32*sc* is provided in such a manner that the audio amplifying device 2 can regenerate the audio clock (CLK_A3) synchronized with the audio clock on the side of the HDMI(2) transmission path. The source device section 32*sc* itself does not transmit any TMDS clock or ACR information over the HDMI transmission path.

The sink device section 22*sk* is contained illustratively in the HDMI receiving section 22 of the audio amplifying device 2. When furnished with the sink device section 22*sk*, the audio amplifying device 2 can generate the aforementioned audio clock (CLK_A3: second content signal clock).

When the second DVD reproducing device 1-2 transmits audio signal data to the display device 3 via the HDMI(2) transmission path, an HDMI(2) audio clock CLK_A2 (first content signal clock) and an HDMI(2) video clock CLK_V2 (first reference clock) are input to the source device section 12*sc*. The HDMI(2) audio clock CLK_A2 has the clock frequency of 128 fs, where fs denotes the sampling frequency of the audio signal data transmitted over the HDMI(2) transmission path (in this case, the audio signal data is reproduced from the DVD by the second DVD reproducing device 1-2). The HDMI(2) audio clock CLK_A2 is thus in synchronism with the audio signal data transmitted over the HDMI(2) transmission path.

And the HDMI(2) video clock CLK_V2 is a video clock (pixel clock) serving as the basis for the TMDS clock to be transmitted through the HDMI(2). The video clock is synchronized with the video signal data to be transmitted from the source to the sink, and the frequency of the video clock is determined by the format complied with by the video signal data (e.g., VGA, 480i, 480p). Also, the video clock is generated using a crystal oscillator contained illustratively in the device acting as the source. Therefore, the cyclic variation characteristic (jitter characteristic) of the video clock has a degree of precision known as crystal precision.

The source device section 12*sc* gets a frequency divider 201 to frequency-divide by 1/N the HDMI(2) TMDS clock obtained on the basis of the input HDMI(2) audio clock CLK_A2, and outputs the result from the frequency division.

Here, the HDMI stipulates recommended values of both the CTS and the N used by the frequency divider 201 as the frequency dividing ratio (first frequency dividing ratio) in relation to the sampling frequency fs of the audio signal data to be transmitted and the TMDS clock frequency. Incidentally, the HDMI stipulates that the audio clock (128 fs), the frequency of the TMDS clock (fTMDS_clock), N, and CTS constitute the following expression:

$$128\ fs = fTMDS\_clock * N/CTS \tag{1}$$

The device acting as the source obtains the recommended value N, illustratively by referencing a table structured to let the value N be determined from the relationship between the sampling frequency of audio signal data and the video clock frequency, or by calculating the value N using a predetermined arithmetic expression that contains the sampling frequency of audio signal data and the video clock frequency.

An N register 203 of the source device section 12*sc* is set with the value N obtained by the second DVD reproducing device 1-2 as described above. The N register 203 holds the set value N, and establishes the value N thus retained as the frequency dividing ratio of the frequency divider 201.

The output of the frequency divider 201 is sent to a period counter 202.

A frequency signal output from the frequency divider 201 and the HDMI(2) TMDS clock are input to the period counter 202. The period counter 202 illustratively counts the frequency of the TMDS clock appearing within one period of the frequency signal output from the frequency divider 201. The value obtained through the counting is output as CTS (Cycle Time Stamp) from the source device section. Here, the CTS output from the source device section 12*sc* (second DVD reproducing device 1-2) is referred to as CTS1 (first frequency information).

And the source device section 12*sc* transmits the HDMI(2) TMDS clock based on the HDMI(2) video clock CLK_V2 and the value N retained in the N register 203, along with the above-mentioned CTS1, to the sink device section 32*sk* through the HDMI(2) transmission path for output.

The CTS1 and N are transmitted in a manner accommodated in the data transmitted over the TMDS channels 0, 1 and 2 as explained above with reference to FIGS. 7 and 8. And the TMDS clock is transmitted over the TMDS clock channel.

The sink device section 32*sk* in this case is contained in the HDMI receiving section 32-1 inside the display device 3. As such, the sink device section 32*sk* is furnished with the capability to regenerate the clock (audio clock) used illustratively for reproducing the audio signal data received by the HDMI receiving section 32-1 via the HDMI transmission path.

Also, a structure made up of the aforementioned source device section 12*sc* and sink device section 32*sk* constitutes the basic structure stipulated by the HDMI for audio clock regeneration.

The sink device section 32*sk* includes a frequency divider 204 and a frequency multiplier 205.

First, the frequency divider 204 inputs the TMDS clock and CTS1 received via the HDMI(2) transmission path, frequency-divides the TMDS clock by the value of CTS1, and outputs the frequency signal obtained through the frequency division to the frequency multiplier 205.

The frequency multiplier 205 multiplies the frequency signal input from the frequency divider 204 by the value N received also via the HDMI(2) transmission path.

First, the frequency signal obtained by the frequency divider 204 is acquired more specifically by frequency-dividing by CPT1 the same HDMI(2) TMDS clock as that used by the period counter 202 of the source device section 12*sc* in obtaining CTS1. Therefore, this frequency signal has the same frequency as that of the frequency signal output from the frequency divider 201 of the source device section 12*sc*. And since the frequency multiplier 205 multiplies this frequency signal by the same value N as that used by the frequency divider 201 of the source device section 12*sc*, the frequency multiplier 205 outputs the same frequency as that of the HDMI(2) audio clock CLK_A2 input to the source device 12*sc*. In other words, the sink device side regenerates the audio clock of the source side.

The clock regenerated by the sink device section 32*sk* of the display device 3 as described above is thus referred to as the internal audio clock CLK_Atv (regenerated first content signal clock) hereunder.

This internal audio clock CLK_Atv is 128 times the actual frequency of the audio signal data transmitted from the second DVD reproducing device 1-2 via the HDMI(2) transmission path. Thus, if the display device 3 is to reproduce audibly the audio signal data transmitted from the second DVD reproducing device 1-2, then the display device 3 needs only carry out digital signal processing for audio reproduction using the reproduction clock obtained by frequency-dividing the internal audio clock CLK_Atv.

With this embodiment, the display device 3 repeats the audio signal data transmitted from the second DVD reproducing device 1-2 for transmission to the audio amplifying device 2 so that the audio amplifying device 2 may proceed with audio reproduction. In conjunction with this, the HDMI receiving section 32-1 of the display device 3 contains the source device section 32*sc*, while the HDMI receiving section 22 of the audio amplifying device 2 incorporates a part corresponding to the sink device section 22*sk* as the relevant part paired with the aforementioned source device section 32*sc*. It should be noted that apart from the sink device section 22*sk* mentioned above, the HDMI receiving section 22 of the audio amplifying device 2 contains parts which correspond to the sink device section and the HDMI sink 110 (see FIG. 6) for regenerating the audio clock in synchronism with the audio signal data received from the first DVD reproducing device 1-1.

In the source device section 32*sc*, a frequency divider 210 first frequency-divides the internal audio clock CLK_Atv by the value N (second frequency dividing ratio) retained in an N register 212. The N held in the N register 212 is obtained illustratively based on the TMDS clock transmitted from the first DVD reproducing device 1-1 via the HDMI(1) transmission path, and on the sampling frequency defined by the format of the digital audio signal transmitted in conjunction with the internal audio clock CLK_Atv (i.e., HDMI(2) audio clock CLK_A2).

The frequency signal output from the frequency divider 210 and the HDMI(1) TMDS clock (second reference clock) are input to a period counter 211. The HDMI(1) TMDS clock is generated on the basis of an HDMI(1) video clock (CLK_V1) acquired by the audio amplifying device 2, and is transmitted from the audio amplifying device 2 to the display device 3 over the TMDS clock channel of the HDMI(1) transmission path. In this case, what is transmitted from the audio amplifying device 2 via the HDMI(1) transmission path is received by the HDMI receiving section 32-2 of the display device 3. The HDMI receiving section 32-2 transfers the HDMI(1) TMDS clock received at this point to the HDMI receiving section 32-1. This makes it possible to input the HDMI(1) TMDS clock to the source device section 32*sc* supposed to be located on the side of the HDMI receiving section 32-1.

The period counter 211 counts the frequency of the HDMI (1) TMDS clock obtained in one period of the frequency signal output from the frequency divider 210, and outputs the resulting count value as CTS2 (second frequency information).

Here, the CTS2 is obtained using not the HDMI(2) TMDS clock but the HDMI(1) TMDS clock. Therefore, compared illustratively with the value of the CTS1, the CTS2 takes a value different from that of the CTS1 in keeping with the difference in frequency between the HDMI(1) TMDS clock and the HDMI(2) TMDS clock as well as the ratio of the frequency values therebetween. This means that the CTS2 is obtained as the value of the CTS1 having been converted (i.e., modified) in accordance with the ratio in frequency between the HDMI(1) TMDS clock and the HDMI(2) TMDS clock.

The CTS2 obtained as described above is output and transmitted to the audio amplifying device 2 along with the value N held in the N register 212. However, as shown in FIG. 2, the HDMI-based connection between the audio amplifying device 2 and the display device 3 is only unidirectional, the audio amplifying device 2 serving as the source and the display device 3 acting as the sink. Thus, the aforementioned CTS2 and N are transmitted over the auxiliary transmission path 4. In practice, this involves the HDMI receiving device 32-1 of the display device 3 transferring the CTS2 and N output from the internal source device section 32*sc* to the auxiliary transmission path-capable interface section 37. The auxiliary transmission path-capable interface section 37 places the CTS2 and N illustratively into the sub-information area of the packet shown in FIG. 9 and transmits the packet to the audio amplifying device 2 along with the audio signal data.

In the audio amplifying device 2, as shown in FIG. 4, the auxiliary transmission path-capable interface section 26 transfers the CTS2 and N information extracted from the received packet to the HDMI receiving section 22. This enables the part supposed to be contained in the HDMI receiving section 22 in correspondence with the sink device section 22*sk*, to obtain the CTS2 and N.

In the aforementioned sink device section 22*sk*, a frequency divider 213 frequency-divides the HDMI(1) TMDS clock by the CTS2 to obtain a frequency signal. Then, in a frequency multiplier 214, the frequency signal obtained by the frequency divider 213 is multiplied by a frequency multiplier 124 by the N acquired along with the CTS2. The output of the frequency multiplier 214 is provided as the audio clock CLK_A3 for reproduction.

The CTS2 is considered to have been obtained by modifying the CTS1 acquired corresponding to the frequency of the HDMI(2) TMDS clock, in accordance with the frequency of the HDMI(1) TMDS clock. Thus, the above-mentioned audio clock CLK_A3 for reproduction is provided by modifying the frequency of the HDMI(2) audio clock CLK_A2 in a manner synchronized with the actual frequency of the HDMI(1) TMDS clock.

The audio amplifying device 2 carries out reproduction signal processing on the audio signal data received via the auxiliary transmission path 4 by use of the aforementioned audio clock CLK_A3 for reproduction. This makes it possible to perform appropriately the reproduction signal processing on the audio signal data transmitted from the display device 3 via the auxiliary transmission channel 4.

It is to be noted that, in order for the audio amplifying device 2 to recognize that the display device 3 is ready to transmit HDMI audio signal data over the auxiliary transmission path 4 so that an appropriately corresponding operation will be started, the display device 3 needs only query the audio amplifying device 2 about the latter's status using illustratively the CEC for the HDMI(1) transmission path (capable of bidirectional communication) connecting the display device 3 with the audio amplifying device 2. In response to the query, the audio amplifying device 2 establishes its internal settings to get ready to receive and process the packets transmitted from the display device 3 via the auxiliary transmission path 4.

Also, in the foregoing description, the data repeating apparatus corresponding to the present invention was shown adapted to the display device, and the data receiving apparatus according to the present invention was shown adapted to the audio amplifying device. Alternatively, these apparatuses may be adapted to various other devices.

Also, this embodiment adopts the HDMI for the first transmission path of the present invention. However, this is not limitative of the present invention; any digital data interface that supports audio signal transmission will do if the present invention can be adapted thereto. And a suitable data interface standard other than the aforementioned IEEE 1394 or Ethernet (registered trademark) may be adopted for the second transmission path to which the auxiliary transmission path corresponds. Although the data transmitted by this embodiment (digital content signal) is supposed to be the audio signal to be reproduced in synchronism with the video signal, the audio signal may alternatively be reproduced as audio-only content not accompanied by a video signal. Further, the present invention may also be adapted to cases where the video signal itself is transmitted.

The invention claimed is:

1. A data transmission and reception system comprising:

a data repeating apparatus; and a data receiving apparatus, wherein said data repeating apparatus includes a first content signal receiving section configured to receive a digital content signal transmitted from an external transmitting apparatus via a first transmission path, a first regenerated element receiving section configured to receive a first reference clock, first frequency dividing ratio information, and first frequency information, said first reference clock being generated by said external transmitting apparatus and transmitted from said external transmitting apparatus via said first transmission path along with said digital content signal, said first frequency dividing ratio information being indicative of a first frequency dividing ratio obtained by said external transmitting apparatus and set by said external transmitting apparatus so as to frequency-divide a first content signal clock corresponding to said digital content signal, said first frequency information being indicative of the frequency of said first reference clock obtained in one period of a frequency signal obtained by frequency-dividing said first content signal clock by said first frequency dividing ratio, a clock regenerating section configured to regenerate said first content signal clock by multiplying by said first frequency dividing ratio a frequency signal obtained by frequency-dividing said first reference clock received by said first regenerated element receiving section by the frequency indicated by said first frequency information, a reference clock receiving section configured to receive a second reference clock which is transmitted from said data receiving apparatus via said first transmission path and which is generated by said data receiving apparatus, a data transmitting section configured to transmit said digital content signal, received by said first content signal receiving section, to said data receiving apparatus over a second transmission path complying with a transmission standard different from that which is complied with by said first transmission path, and a regenerated element transmitting section configured to transmit second frequency dividing ratio information and second frequency information over said second transmission path along with said digital content signal received by said first content signal receiving section, said second frequency dividing ratio information being indicative of a second frequency dividing ratio set so as to frequency-divide the regenerated first clock, said second frequency information being indicative of the frequency of said second reference clock obtained in one period of a frequency signal obtained by frequency-dividing the regenerated first content signal clock by said second frequency dividing ratio, and said data receiving apparatus includes a second reference clock transmitting section configured to transmit said second reference clock, generated by said data receiving apparatus, to said data repeating apparatus via said first transmission path, a second content signal receiving section configured to receive said digital content signal transmitted from said data repeating apparatus over said second transmission path, a second regenerated element receiving section configured to receive said second frequency dividing ratio information and said second frequency information transmitted from said data repeating apparatus over said second transmission path, and a clock generating section configured to generate a second content signal clock synchronized with said digital content signal received by said second content signal receiving section, by multiplying a frequency signal obtained by frequency-dividing said second reference clock by the frequency value indicated by said second frequency information, by the frequency dividing ratio indicated by said second frequency dividing ratio information.

2. A data repeating apparatus comprising:

a content signal receiving section configured to receive a digital content signal transmitted from an external transmitting apparatus via a first transmission path;

a regenerated element receiving section configured to receive a first reference clock, first frequency dividing ratio information, and first frequency information, said first reference clock being generated by said external transmitting apparatus and transmitted from said external transmitting apparatus via said first transmission path along with said digital audio signal, said first frequency dividing ratio information being indicative of a first frequency dividing ratio obtained by said external transmitting apparatus and set by said external transmitting apparatus so as to frequency-divide a first content signal clock corresponding to said digital content signal, said first frequency information being indicative of the frequency of said first reference clock obtained in one period of a frequency signal obtained by frequency-dividing said first content signal clock by said first frequency dividing ratio;

a clock regenerating section configured to regenerate said first content signal clock by multiplying by said first frequency dividing ratio a frequency signal obtained by frequency-dividing said first reference clock received by said regenerated element receiving section by the frequency indicated by said first frequency information;

a data transmitting section configured to transmit said digital content signal, received by said first content signal receiving section, to said data receiving apparatus over a second transmission path complying with a transmission standard different from that which is complied with by said first transmission path;

a reference clock receiving section configured to receive a second reference clock which is transmitted from said data receiving apparatus via said first transmission path and which is generated by said data receiving apparatus; and a regenerated element transmitting section configured to transmit second frequency dividing ratio information and second frequency information over said second transmission path along with said digital content signal received by said first content signal receiving section, said second frequency dividing ratio information being indicative of a second frequency dividing ratio set so as to frequency-divide the regenerated first clock, said second frequency information being indicative of the frequency of said second reference clock obtained in one period of a frequency signal obtained by frequency-dividing the regenerated first content signal clock by said second frequency dividing ratio.

3. The data repeating apparatus according to claim 2, wherein said regenerated element transmitting section places into packets said second frequency dividing ratio information and said second frequency information according to rules by which frequency dividing ratio information and frequency information are transmitted over said first transmission path, before transmitting the packets in a manner stored in predetermined areas of a data structure for transmission over said second transmission path.

4. A data repeating method comprising:

a content signal receiving step of receiving a digital content signal transmitted from an external transmitting apparatus via a first transmission path;

a regenerated element receiving step of receiving a first reference clock, first frequency dividing ratio information, and first frequency information, said first reference clock being generated by said external transmitting apparatus and transmitted from said external transmitting apparatus via said first transmission path along with said digital content signal, said first frequency dividing ratio information being indicative of a first frequency dividing ratio obtained by said external transmitting apparatus and set by said external transmitting apparatus so as to frequency-divide a first content signal clock corresponding to said digital content signal, said first frequency information being indicative of the frequency of said first reference clock obtained in one period of a frequency signal obtained by frequency-dividing said first content signal clock by said first frequency dividing ratio;

a clock regenerating step of regenerating said first content signal clock by multiplying by said first frequency dividing ratio a frequency signal obtained by frequency-dividing said first reference clock received in said regenerated element receiving step by the frequency indicated by said first frequency information;

a data transmitting step of transmitting said digital content signal, received in said first content signal receiving step, to said data receiving apparatus over a second transmission path complying with a transmission standard different from that which is complied with by said first transmission path;

a reference clock receiving step of receiving a second reference clock which is transmitted from said data receiving apparatus via said first transmission path and which is generated by said data receiving apparatus; and a regenerated element transmitting step of transmitting second frequency dividing ratio information and second frequency information over said second transmission path along with said digital content signal received in said first content signal receiving step, said second frequency dividing ratio information being indicative of a second frequency dividing ratio set so as to frequency-divide the regenerated first clock, said second frequency information being indicative of the frequency of said second reference clock obtained in one period of a frequency signal obtained by frequency-dividing the regenerated first content signal clock by said second frequency dividing ratio.

* * * * *